(12) United States Patent
Jia et al.

(10) Patent No.: US 10,876,006 B1
(45) Date of Patent: Dec. 29, 2020

(54) PRODUCTION METHOD FOR EFFICIENTLY CONTROLLING SPECIFIC SURFACE AREA OF CONDUCTIVE CARBON BLACK, AND MATERIAL DELIVERING DEVICE

(71) Applicant: JIAOZUO CITY HEXING CHEMICAL INDUSTRY CO., LTD., Henan (CN)

(72) Inventors: Shuili Jia, Henan (CN); Julan Jiao, Henan (CN); Ningning Yang, Henan (CN)

(73) Assignee: Jiaozuo City Hexing Chemical Industry Co., Ltd., Henan (CN)

( * ) Notice: Subject to any disclaimer, the term of this patent is extended or adjusted under 35 U.S.C. 154(b) by 0 days.

(21) Appl. No.: 16/902,884

(22) Filed: Jun. 16, 2020

(30) Foreign Application Priority Data

Jun. 19, 2019 (CN) .......................... 2019 1 0539720

(51) Int. Cl.
  *C09C 1/50* (2006.01)
  *B01J 12/02* (2006.01)

(52) U.S. Cl.
  CPC ............... *C09C 1/50* (2013.01); *B01J 12/02* (2013.01); *C01P 2006/12* (2013.01); *C01P 2006/40* (2013.01)

(58) Field of Classification Search
  CPC ....................................................... C09C 1/50
  See application file for complete search history.

(56) References Cited

U.S. PATENT DOCUMENTS 4,412,974 A * 11/1983 Nicolas ................. C03B 40/027
                                                            422/156
4,725,424 A    2/1988 Tanaka et al.

FOREIGN PATENT DOCUMENTS

| CN | 102174277 A | 9/2011 |
| CN | 106543777 A | 3/2017 |
| CN | 109370268 A | 2/2019 |

OTHER PUBLICATIONS

Office Action 1 for CN201910539720.8 dated Dec. 23, 2019.
Office Action 2 for CN201910539720.8 dated Jan. 3, 2020.
Search Report for CN201910539720.8.
Notification to Grant for CN01910539720.8 dated Mar. 27, 2020.

* cited by examiner

*Primary Examiner* — Stuart L Hendrickson
(74) *Attorney, Agent, or Firm* — Barnes & Thornburg LLP

(57) ABSTRACT

Disclosed are a production method for efficiently controlling a specific surface area of conductive carbon black, and a material delivering device. The production method for efficiently controlling a specific surface area of conductive carbon black includes making acetylene mixed with a hydrocarbon raw material undergo a pyrolysis reaction at 1300 to 1500° C., wherein the hydrocarbon raw material includes one, or a combination of more than one, of hydrocarbon compounds. When acetylene is introduced to undergo a pyrolysis reaction at 1800° C., conductive carbon black is obtained with a specific surface area of generally 80 m$^2$/g or more. When acetylene is mixed with a hydrocarbon raw material so that the temperature of the pyrolysis reaction is reduced to 1300 to 1500° C., conductive carbon black is obtained with a specific surface area of substantially from 40 to 80 m$^2$/g by controlling the pyrolysis temperature.

9 Claims, 4 Drawing Sheets

US 10,876,006 B1

PRODUCTION METHOD FOR EFFICIENTLY CONTROLLING SPECIFIC SURFACE AREA OF CONDUCTIVE CARBON BLACK, AND MATERIAL DELIVERING DEVICE

CROSS-REFERENCE TO RELATED APPLICATIONS

The present application claims priority to Chinese Patent Application No. 201910539720.8, filed with the Chinese Patent Office on Jun. 19, 2019, entitled "Production Method for Efficiently Controlling Specific Surface Area of Conductive Carbon Black, and Material Delivering Device", which is incorporated herein by reference in its entirety.

TECHNICAL FIELD

The present disclosure relates to the technical field of preparation of conductive carbon black, and in particular to a production method for efficiently controlling a specific surface area of conductive carbon black, and a material delivering device.

BACKGROUND ART

Carbon black produced from acetylene by a method using calcium carbide has excellent thermal and electrical conductivity. Here, the produced conductive carbon black having a smaller particle size has a larger specific surface area, and the carbon black having a larger specific surface area exhibits better thermal and electrical conductivity.

However, when conductive carbon black particles have a smaller particle size, the particles are more likely to be agglomerated and mixed unevenly during the mixing process, which affects the performance of the resulting composite material. Therefore, when used in some fields, for example, when prevalently used in the lithium battery industry, conductive carbon black is generally required to be controlled to have a specific surface area between 40 and 80 $m^2/g$. Either a too large or too small specific surface area will affect the overall performance of the positive and negative electrode materials. Conductive carbon black is prepared with a specific surface area of 80 $m^2/g$ or more by using conventional methods in the production process including pyrolysis of acetylene.

SUMMARY

In a first aspect, an example of the present disclosure provides a production method for efficiently controlling a specific surface area of a conductive carbon black, comprising firstly introducing an acetylene, igniting the acetylene to form a reaction zone at a temperature of 1500 to 1800° C., then introducing a hydrocarbon raw material into the reaction zone to occur a pyrolysis reaction, and collecting a product at a temperature of 1300 to 1500° C., wherein the hydrocarbon raw material comprises an aromatic hydrocarbon or an olefin; and a mass ratio of the acetylene to the hydrocarbon raw material is 1:0.1 to 1:0.4.

In a second aspect, an example of the present disclosure provides a production method for efficiently controlling a specific surface area of a conductive carbon black, comprising: firstly introducing an acetylene, igniting the acetylene to form a reaction zone at a temperature of 1500 to 1800° C., delivering acetylene and a hydrocarbon raw material in a preset mixed form to the reaction zone to occur a pyrolysis reaction and collecting a product at a temperature of 1300 to 1500° C., wherein the preset mixed form is a form in which the hydrocarbon raw material is surrounded by the acetylene; and the hydrocarbon raw material comprises an aromatic hydrocarbon or an olefin.

In a third aspect, an example of the present disclosure provides a material delivering device, configured for implementing the production method for efficiently controlling a specific surface area of a conductive carbon black according to claim 5, wherein the material delivering device comprises a material delivering column extending from a first end to a second end, wherein the material delivering column comprises:

an inner layer, wherein a first cavity is formed by the inner layer, the first cavity has a first feed inlet provided at the first end and a first discharge outlet provided at the second end; and an outer layer, wherein a second cavity is formed between the inner layer and the outer layer, the second cavity has a second feed inlet provided at the first end and a second discharge outlet provided at the second end.

BRIEF DESCRIPTION OF DRAWINGS

In order to more clearly illustrate technical solutions of embodiments of the present disclosure, drawings required for use in the embodiments will be described briefly below. It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE NUMERALS

Figure 1:
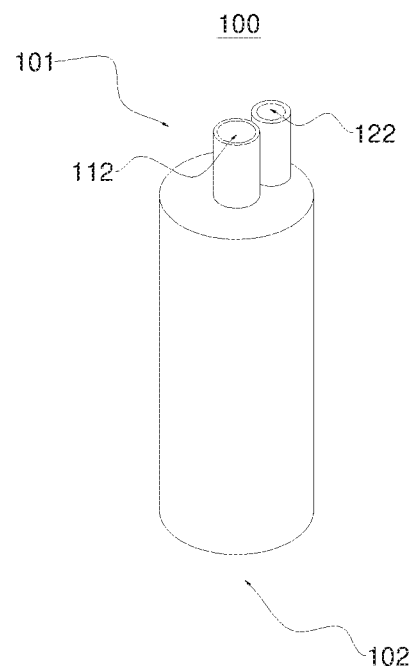
FIG. 1 is a schematic structural view of a material delivering column according to an embodiment of the present disclosure.
Figure 2:
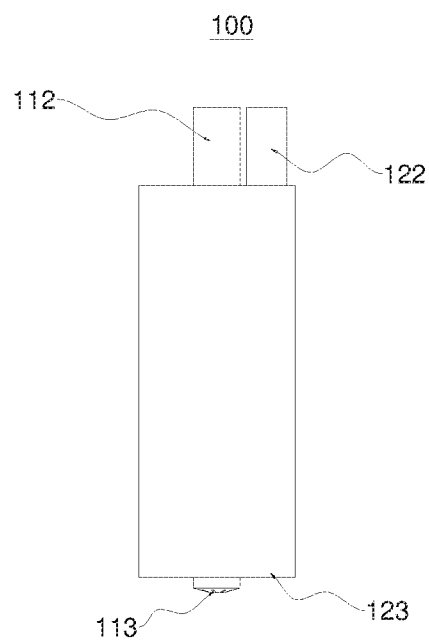
FIG. 2 is a front view of the material delivering column according to the embodiment of the present disclosure.
Figure 3:
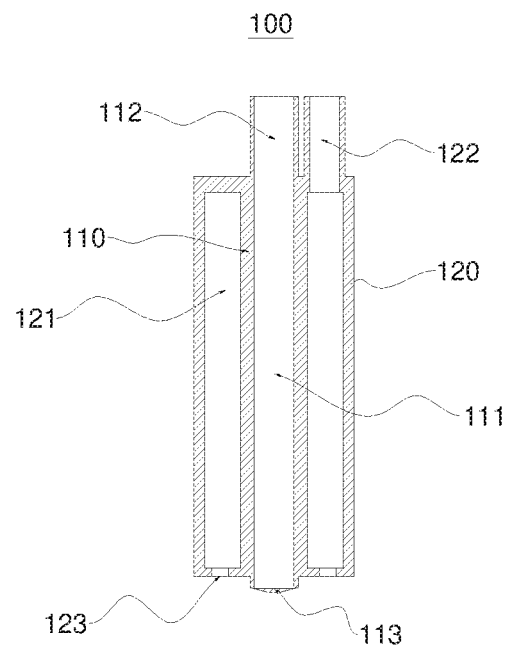
FIG. 3 is a first sectional view of the material delivering column according to the embodiment of the present disclosure.
Figure 4:
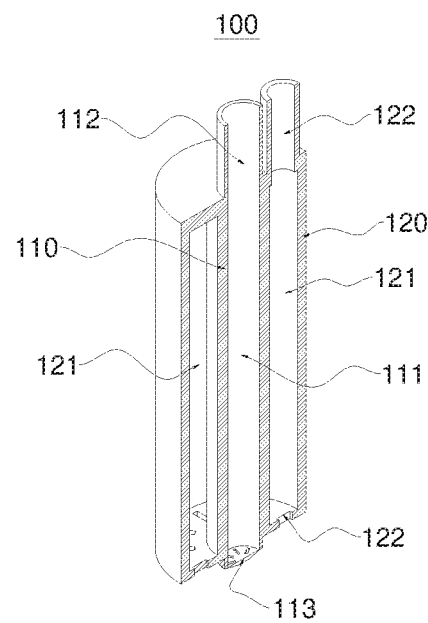
FIG. 4 is a second sectional view of the material delivering column according to the embodiment of the present disclosure.

100—material delivering column; 101—first end; 102—second end; 110—inner layer; 111—first cavity; 112—first feed inlet; 113—first discharge outlet; 114—first nozzle; 120—outer layer; 121—second cavity; 122—second feed inlet; 123—second discharge outlet; 124—second nozzle; 200—charging device; 210—heater;

220—booster pump; 230—storage tank; 240—flow meter; 250—electric valve; 300—reactor; 400—acetylene delivering device.

DETAILED DESCRIPTION OF EMBODIMENTS

The embodiments of the present disclosure will be described in detail below in connection with examples, but it will be understood by those skilled in the art that the following examples are only intended to illustrate the present disclosure and should not be considered as limiting the scope of the present disclosure. Examples are carried out in accordance with conventional conditions or conditions recommended by manufacturers if no specific conditions are specified in the examples. Reagents or instrument used, whose manufacturers are not specified, are all conventional products that are available commercially.

The present disclosure provides a production method for efficiently controlling a specific surface area of conductive carbon black, and a material delivering device, by which conductive carbon black can be prepared with a specific surface area of substantially from 40 to 80 $m^2/g$.

Embodiments of the present disclosure are implemented as follows:

In a first aspect, an example of the present disclosure provides a production method for efficiently controlling a specific surface area of conductive carbon black, comprising making acetylene mixed with a hydrocarbon raw material undergo a pyrolysis reaction at 1300 to 1500° C., wherein the hydrocarbon raw material includes one, or a combination of more than one, of hydrocarbon compounds.

In the above technical solution, the pyrolysis reaction of acetylene generally occurs at a temperature of about 1800° C. When pure acetylene is introduced to undergo a pyrolysis reaction at 1800° C., conductive carbon black is obtained with a specific surface area of generally 80 $m^2/g$ or more. When acetylene is mixed with a hydrocarbon raw material so that the temperature of the pyrolysis reaction is reduced to 1300 to 1500° C., conductive carbon black is obtained with a specific surface area of substantially from 40 to 80 $m^2/g$ by controlling the pyrolysis temperature.

With reference to the first aspect, in a first possible example of the first aspect of the present disclosure, the above hydrocarbon raw material includes any one or more of an aromatic hydrocarbon, an olefin, and natural gas, wherein the aromatic hydrocarbon includes toluene and/or benzene; and the olefin includes any one or more of ethylene, propylene, and butadiene.

In the above example, the aromatic hydrocarbon, the olefin, and natural gas release less heat than acetylene in the pyrolysis. The pyrolysis reactions of the aromatic hydrocarbon, the olefin, and natural gas occur at a temperature of 600 to 1300° C. If the aromatic hydrocarbon, the olefin, or natural gas releasing less heat and undergoing a pyrolysis reaction at a lower temperature is mixed with acetylene for pyrolysis, the pyrolysis reaction can occur at a temperature between 1300 to 1500° C., so that conductive carbon black with a specific surface area of substantially from 40 to 80 $m^2/g$ is prepared by the pyrolysis.

Toluene and benzene are conventional aromatic hydrocarbons. Ethylene, propylene, and butadiene are conventional olefins. The above-mentioned aromatic hydrocarbons and olefins can be derived from a wide range of raw materials and have low prices, and can reduce cost when used to add in the process of production of conductive carbon black.

With reference to the first aspect, in a first possible example of the first aspect of the present disclosure, a mass ratio of the above acetylene to the hydrocarbon raw material is 1:0.1 to 1:0.4.

Optionally, the mass ratio of acetylene to the hydrocarbon raw material is 1:0.2 to 1:0.4.

Optionally, the mass ratio of acetylene to the hydrocarbon raw material is 1:0.2 to 1:0.3.

In the above example, when acetylene and the hydrocarbon raw material are mixed in a mass ratio of 1:0.1 to 1:0.4, the pyrolysis reaction can be controlled at a temperature of 1300 to 1500° C. after acetylene releasing more heat during the pyrolysis reaction is mixed with the hydrocarbon raw material releasing less heat during the pyrolysis reaction, so that it is ensured that conductive carbon black is prepared with a specific surface area of substantially from 40 to 80 $m^2/g$.

With reference to the first aspect, in a first possible example of the first aspect of the present disclosure, a method for preparing the above conductive carbon black includes: firstly introducing acetylene gas, igniting the acetylene gas to form a reaction zone, after a reaction is conducted for a first period of time, then introducing the gaseous hydrocarbon raw material into the reaction zone, and after the reaction is continued for a second period of time, collecting a product.

In the above example, acetylene gas is first introduced and ignited to form a reaction zone, so that the reaction temperature reaches 1500 to 1800° C. After the pyrolysis reaction is initiated, a gaseous hydrocarbon raw material is further introduced into the reaction zone, and acetylene and the gaseous hydrocarbon raw material are mixed to undergo the pyrolysis reaction together and release heat, so that the temperature is slowly stabilized at 1300 to 1500° C., and then the collection of a product is started. The conductive carbon black collected at this time has a specific surface area and a particle size which are distributed uniformly, wherein the specific surface area is substantially from 40 to 80 $m^2/g$.

In a second aspect, an example of the present disclosure provides a production method for efficiently controlling a specific surface area of conductive carbon black, comprising: delivering acetylene and a hydrocarbon raw material in a preset mixed form to a reaction zone, and making acetylene mixed with the hydrocarbon raw material undergo a pyrolysis reaction at 1300 to 1500° C. in the reaction zone, wherein the preset mixed form is a form in which the hydrocarbon raw material is surrounded by the acetylene; and the hydrocarbon raw material includes one, or a combination of more than one, of hydrocarbon compounds In the above technical solution, the pyrolysis reaction of acetylene generally occurs at a temperature of about 1800° C. When pure acetylene is introduced to undergo a pyrolysis reaction at 1800° C., the obtained conductive carbon black has a specific surface area which is generally 80 $m^2/g$ or more. When acetylene and a hydrocarbon raw material are mixed in a form in which the hydrocarbon raw material is surrounded by acetylene, so that the temperature of the pyrolysis reaction is reduced to 1300 to 1500° C., conductive carbon black is obtained with a specific surface area of substantially from 40 to 80 $m^2/g$ by controlling the pyrolysis temperature. This mixing mode has good stability, so that the temperature is distributed uniformly in the reaction zone without partly having a higher or lower temperature.

In a third aspect, an example of the present disclosure provides a material delivering device used for implementing the production method for efficiently controlling a specific surface area of conductive carbon black described above, comprising a material delivering column extending from a first end to a second end, wherein the material delivering column comprises an inner layer, a first cavity formed by the inner layer, wherein the first cavity has a first feed inlet provided at the first end and a first discharge outlet provided at the second end; and an outer layer, a second cavity formed between the inner layer and the outer layer, wherein the second cavity has a second feed inlet provided at the first end and a second discharge outlet provided at the second end.

In the above technical solution, the first cavity and the second cavity are arranged independently of each other and have their respective feed inlets and discharge outlets. The second cavity is provided around the first cavity, and the discharge outlet of the second cavity is provided around the discharge outlet of the first cavity, so that the material discharged from the discharge outlet of the second cavity can surround the material discharged from the discharge outlet of the first cavity.

With reference to the third aspect, in a first possible example of the third aspect of the present disclosure, the above first discharge outlet is provided with a first nozzle, the second discharge outlet is provided with a second nozzle, and the first nozzle is inclined outward along its center so that the material sprayed from the first nozzle is mixed uniformly with the material sprayed from the second nozzle.

In the above example, the first nozzle and the second nozzle advantageously disperse the materials discharged from the first discharge outlet and the second discharge outlet. Moreover, the first nozzle provided at the first discharge outlet is inclined outward from its center, which advantageously allows the material from the first discharge outlet to be discharged radially and further better mixed with the material discharged from the second discharge outlet.

With reference to the third aspect, in a second possible example of the third aspect of the present disclosure, the above material delivering device comprises a charging device, wherein the charging device comprises a heater connected to the material delivering column, wherein the heater is configured to heat the hydrocarbon raw material in a liquid state at room temperature to a gaseous state; a storage tank connected to the heater, wherein the storage tank is configured to store the hydrocarbon raw material; and a booster pump provided to the storage tank, wherein the booster pump is configured to pump the hydrocarbon raw material.

In the above example, the charging device is configured to supply the processed raw material to the material delivering column. The charging device communicates with the material delivering column, and the charging device is configured to store a material and to heat and pressurize and deliver the stored material to the material delivering column.

With reference to a second possible embodiment of the third aspect, in a third possible example of the third aspect of the present disclosure, the charging device comprises a flow meter provided between the heater and the material delivering column, and the flow meter is configured to reflect a volume of the hydrocarbon raw material delivered.

In the above example, the delivery rate of the material can be controlled timely and effectively by the delivery volume data displayed on the flow meter.

With reference to the second possible embodiment of the third aspect, in a third possible example of the third aspect of the present disclosure, the above charging device comprises an electric valve provided between the heater and the material delivering column, and the electric valve is configured to control opening and closing of the charging device.

In the above example, the opening and closing of the charging device is controlled by an electric valve, so as to control the opening and closing of the entire material delivering device, so that the material delivering device can be closed in time in the event of an accident, to avoid more adverse events.

The pyrolysis reaction of acetylene is an exothermic reaction. After the temperature of the reaction zone in the reactor is raised to 800° C. or more by other means, acetylene begins to undergo a pyrolysis reaction. Moreover, since the pyrolysis reaction of acetylene is an exothermic reaction, the reaction may occur automatically and is eventually stabilized at about 1800° C.

When the pyrolysis reaction occurs at a temperature of about 1800° C., most of the prepared conductive carbon black has a specific surface area of 80 $m^2/g$ or more. Although having better electrical conductivity and thermal conductivity, the conductive carbon black with such a specific surface area has a smaller particle size and is likely to be agglomerated and mixed unevenly during the mixing process, which affects the performance of the prepared composite material. Therefore, when used in some fields, for example, when prevalently used in the lithium battery industry, conductive carbon black is generally required to be controlled to have a specific surface area between 40 and 80 $m^2/g$. Either a too large or too small specific surface area will affect the overall performance of the positive and negative electrode materials. A production method for efficiently controlling a specific surface area of conductive carbon black and a material delivering device are proposed here, used for preparing conductive carbon black with a specific surface area of substantially between 40 and 80 $m^2/g$.

A production method for efficiently controlling a specific surface area of conductive carbon black, and a material delivering device according to embodiments of the present disclosure will be specifically described below.

The present disclosure provides a production method for efficiently controlling a specific surface area of conductive carbon black, comprising making acetylene mixed with a hydrocarbon raw material undergo a pyrolysis reaction at 1300 to 1500° C.;

wherein the hydrocarbon raw material includes one, or a combination of more than one, of hydrocarbon compounds.

The pyrolysis of acetylene is an exothermic reaction. After a certain temperature is reached, sufficient heat can be supplied to acetylene by its pyrolysis reaction so that the pyrolysis of acetylene occurs continuously and automatically. When the reaction is stabilized, the pyrolysis reaction of acetylene reaches a temperature of 1800° C.

The pyrolysis of some hydrocarbon raw materials is also an exothermic reaction, but less heat is released per unit mass than acetylene. During the pyrolysis reaction of these hydrocarbon raw materials, when the reaction is stabilized, the heat released by the hydrocarbon raw materials enables the pyrolysis reaction to reach a temperature of 600 to 1300° C.

When acetylene and the hydrocarbon raw material are mixed in a certain ratio, the hydrocarbon raw material releasing less heat can balance the acetylene releasing more heat. The mixed system of acetylene and the hydrocarbon raw material with the same mass releases less heat than a reaction system consisting totally of acetylene, so that the pyrolysis reaction occurs at a temperature reduced from 1800° C. to 1300-1500° C., and conductive carbon black with a specific surface area of substantially from 40 to 80 $m^2/g$ is produced by the pyrolysis.

It should be noted that, in an embodiment of the present disclosure, the pyrolysis reaction occurs at a temperature of between 1300 and 1500° C., and the pyrolysis reaction may be conducted at a temperature of 1300 to 1400° C., 1400 to 1500° C., 1300° C., 1400° C., or 1500° C. In other embodiments of the present disclosure, the pyrolysis reaction may be conducted at a temperature of 1290° C., 1510° C., or the like.

In an embodiment of the present disclosure, the prepared conductive carbon black has a specific surface area of substantially from 40 to 80 m$^2$/g, and includes conductive carbon black with a specific surface area of substantially from 50 to 70 m$^2$/g, and conductive carbon black with a specific surface area of substantially from 60 to 80 m$^2$/g.

First, acetylene gas is continuously introduced into the reactor, and the acetylene gas is ignited to form a reaction zone of 1500 to 1800° C. for initiating a pyrolysis reaction. Then, a gaseous hydrocarbon raw material is continuously introduced into the reactor and mixed with acetylene to undergo the pyrolysis reaction, and a product is collected after the temperature is stabilized at 1300 to 1500° C.

Alternatively, the reactor is heated to reach a temperature of 800° C., acetylene gas and a gaseous hydrocarbon raw material are introduced into the reactor continuously and simultaneously, the heating device is removed after the temperature starts to rise, and a product is collected after the temperature is stabilized at 1300 to 1500° C.

Optionally, the hydrocarbon raw material includes any one or more of an aromatic hydrocarbon, an olefin, and natural gas.

Optionally, the aromatic hydrocarbon includes toluene and/or benzene.

Optionally, the olefin includes any one or more of ethylene, propylene, and butadiene.

In an embodiment of the present disclosure, the hydrocarbon raw material may be an aromatic hydrocarbon, including toluene, benzene, or a mixture of toluene and benzene, or the hydrocarbon raw material may be an olefin, including ethylene, propylene, butadiene, a mixture of ethylene and propylene, a mixture of ethylene and butadiene, a mixture of propylene and butadiene, or a mixture of ethylene, propylene and butadiene. In other embodiments of the present disclosure, the hydrocarbon raw material may be natural gas, or a mixture of natural gas and ethylene.

Toluene and benzene are conventional aromatic hydrocarbons. Ethylene, propylene, and butadiene are conventional olefins. The above-mentioned aromatic hydrocarbons and olefins can be derived from a wide range of raw materials and have low prices, and can reduce cost when used to add in the process of production of conductive carbon black.

A mass ratio of acetylene to the hydrocarbon raw material is 1:0.1 to 1:0.4. When acetylene and the hydrocarbon raw material are mixed in a mass ratio of 1:0.1 to 1:0.4, the pyrolysis reaction can be controlled at a temperature of 1300 to 1500° C. after acetylene releasing more heat during the pyrolysis reaction is mixed with the hydrocarbon raw material releasing less heat during the pyrolysis reaction, so that it is ensured that conductive carbon black is prepared with a specific surface area of substantially from 40 to 80 m$^2$/g.

Optionally, the mass ratio of acetylene to the hydrocarbon raw material is 1:0.2 to 1:0.4.

Optionally, the mass ratio of acetylene to the hydrocarbon raw material is 1:0.2 to 1:0.3.

The present disclosure further provides a production method for efficiently controlling a specific surface area of conductive carbon black, comprising: delivering acetylene and a hydrocarbon raw material in a preset mixed form to a reaction zone, and making acetylene mixed with the hydrocarbon raw material undergo a pyrolysis reaction at 1300 to 1500° C. in the reaction zone;

wherein the preset mixed form is a form in which the hydrocarbon raw material is surrounded by acetylene;

the hydrocarbon raw material includes one, or a combination of more than one, of hydrocarbon compounds.

The hydrocarbon raw material surrounded by acetylene advantageously allows the acetylene and the hydrocarbon raw material to reach the reaction zone at the same time and undergo a pyrolysis reaction at the same time, so that the temperature is distributed uniformly in the reaction zone without partly having a higher or lower temperature, which facilitates the manufacture of conductive carbon black with uniform particle size.

Referring to FIGS. 1, 2, 3, 4, and 5, the present disclosure further provides a material delivering device, used for implementing the production method for efficiently controlling a specific surface area of conductive carbon black described above, which comprises a material delivering column 100 extending from a first end 101 to a second end 102, the material delivering column 100 comprising:

an inner layer 110, a first cavity 111 being formed by the inner layer 110, the first cavity 111 having a first feed inlet 112 provided at the first end 101 and a first discharge outlet 113 provided at the second end 102; and an outer layer 120, a second cavity 121 being formed between the inner layer 110 and the outer layer 120, the second cavity 121 having a second feed inlet 122 provided at the first end 101 and a second discharge outlet 123 provided at the second end 102.

This material delivering device is used for implementing the production method for efficiently controlling a specific surface area of conductive carbon black described above, and is used for delivering acetylene gas and a gaseous hydrocarbon raw material to the reactor and then to the reaction zone.

The first cavity 111 and the second cavity 121 in the material delivering column 100 are provided independently of each other, have their respective feed inlets and discharge outlets, and can be used for simultaneously delivering two materials. The second cavity 121 is provided around the first cavity 111, and the discharge outlet of the second cavity 121 is provided around the discharge outlet of the first cavity 111, so that the material discharged from the discharge outlet of the second cavity 121 can surround the material discharged from the discharge outlet of the first cavity 111.

When this material delivering device is utilized in the production method for efficiently controlling a specific surface area of conductive carbon black described above, a gaseous hydrocarbon raw material is delivered by using the first cavity 111, and acetylene gas is delivered by the second cavity 121. Since the second discharge outlet 123 of the second cavity 121 is provided around the first discharge outlet 113 of the first cavity 111, the acetylene gas can be discharged, in a state surrounding the gaseous hydrocarbon raw material, from the material delivering column 100 and finally to the reaction zone to undergo a pyrolysis reaction.

The position and shape of the second feed inlet 122 are not limited in the present disclosure. In an embodiment of the present disclosure, both the first feed inlet 112 and the second feed inlet 122 are circular feed inlets. The second feed inlet 122 is provided on a side of the first feed inlet 112. The material is fed from the second feed inlet 122 and then moves along the annular second cavity 121 and fills the entire second cavity 121 due to flowability of the gas. In other embodiments of the present disclosure, the second feed inlet 122 may be an annular feed inlet corresponding to the annular second cavity 121 and provided around the first feed inlet 112.

Figure 5:
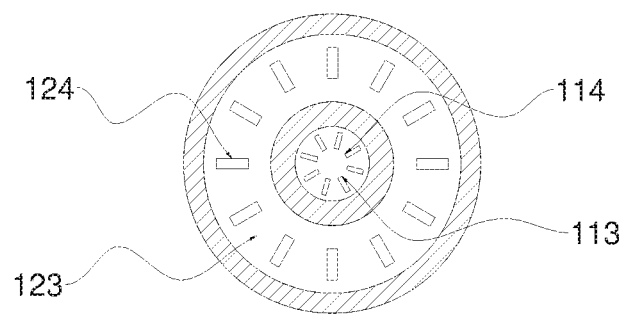
FIG. 5 is a top view of a discharge outlet of the material delivering column according to the embodiment of the present disclosure.
Figure 6:
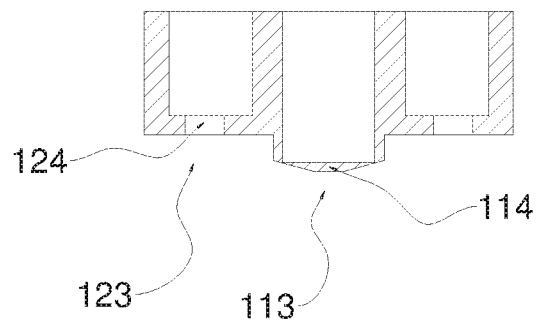
FIG. 6 is a schematic structural view of the discharge outlet of the material delivering column according to the embodiment of the present disclosure.

Referring to FIGS. 5 and 6, the first discharge outlet 113 is provided with a first nozzle 114, the second discharge outlet 123 is provided with a second nozzle 124, and the first nozzle 114 is inclined outward from its center so that the material sprayed from the first nozzle 114 is mixed uniformly with the material sprayed from the second nozzle 124.

The first nozzle 114 and the second nozzle 124 advantageously disperse the materials discharged from the first discharge outlet 113 and the second discharge outlet 123. Moreover, the first nozzle 114 provided at the first discharge outlet 113 is inclined outward from its center at an inclination angle of 10 to 30°. The inclination arrangement advantageously allows the material discharged from the first discharge outlet 113 to be discharged radially and further better mixed with the material discharged from the second discharge outlet 123.

Figure 7:
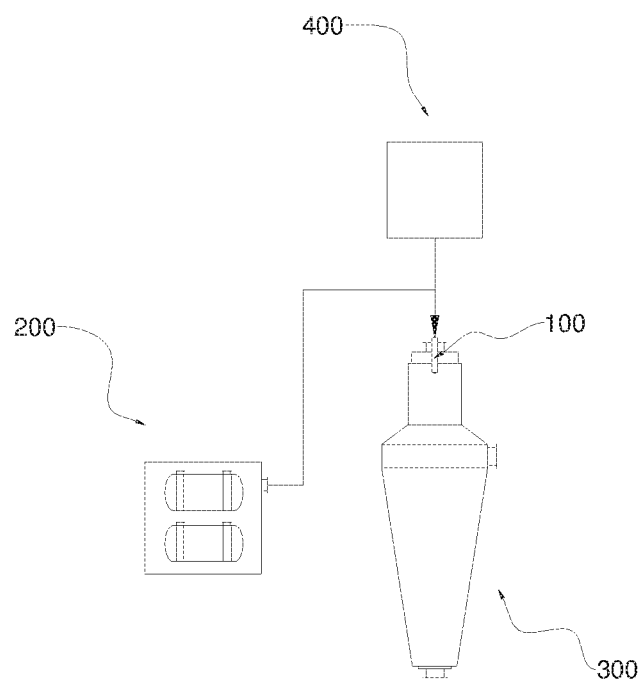
FIG. 7 is a schematic structural view of a material delivering device according to an embodiment of the present disclosure.

Referring to FIG. 7, optionally, the material delivering device further comprises a charging device 200. The charging device 200 is connected to the feed inlets of the material delivering column 100. The charging device 200 is configured to store a material and to heat and pressurize and then deliver the stored material to the material delivering column 100.

When this material delivering device is utilized in the production method for efficiently controlling a specific surface area of conductive carbon black described above, the material delivering column 100 is provided at the opening of the reactor 300, an acetylene delivering device 400 is connected to the second feed inlet 122 of the material delivering column 100, and acetylene gas is delivered from an acetylene storage tank through the second feed inlet 122 of the material delivering column 100 to the second cavity 121 of the material delivering column 100. The charging device 200 is configured to store the hydrocarbon raw material and cause the liquid hydrocarbon raw material to be heated into a gas and pressurized and then delivered to the first cavity 111 of the material delivering column 100 through the first feed inlet 112 of the material delivering column 100.

Figure 8:
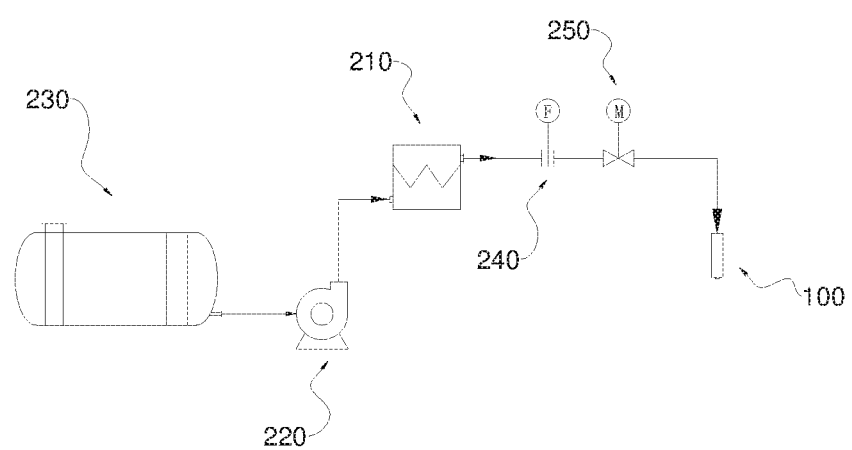
FIG. 8 is a schematic structural view of a charging device according to an embodiment of the present disclosure.

Referring to FIG. 8, the charging device 200 comprises a heater 210, a booster pump 220, a storage tank 230, a flow meter 240, and an electric valve 250. The storage tank 230 is connected to the heater 210. The heater 210 is connected to the material delivering column 100. The booster pump 220 is provided between the storage tank 230 and the heater 210. The flow meter 240 and the electric valve 250 are provided between the heater 210 and the material delivering column 100. The storage tank 230 is configured to store the hydrocarbon raw material. The heater 210 is configured to heat the hydrocarbon raw material in a liquid state at room temperature to a gaseous state. The booster pump 220 is configured to pump the hydrocarbon raw material. The flow meter 240 is configured to reflect the volume of the hydrocarbon raw material delivered. The electric valve 250 is configured to control the opening and closing of the charging device 200.

Optionally, the heater 210 heats the hydrocarbon raw material to 100 to 150° C.

The booster pump 220 pressurizes the gaseous hydrocarbon raw material to 40 to 60 kPa, the acetylene delivering device 400 pressurizes the acetylene gas to 40 to 60 kPa, and the pressurized gaseous hydrocarbon raw material and the pressurized acetylene gas are directly delivered by the material delivering column 100 to the reaction zone where a pyrolysis reaction occurs.

A production method for efficiently controlling a specific surface area of conductive carbon black, and a material delivering device according to the present disclosure will be described below in further detail in connection with examples.

Example 1

The example of the present disclosure provides a production method for efficiently controlling a specific surface area of conductive carbon black, comprising: firstly introducing acetylene gas into a reactor at a rate of 70 m$^3$/h through a material delivering device and igniting the acetylene gas to form a reaction zone where a reaction is conducted for 40 min such that the temperature reaches 1600° C., then introducing acetylene gas into the reactor at a rate of 58.3 m$^3$/h and simultaneously introducing gaseous toluene into the reactor at a rate of 11.7 m$^3$/h, and collecting a product after the pyrolysis system runs for 80 min and the temperature of the reaction zone is stabilized at about 1400° C.

Example 2

The example of the present disclosure provides a production method for efficiently controlling a specific surface area of conductive carbon black, comprising: firstly introducing acetylene gas into a reactor at a rate of 70 m$^3$/h through a material delivering device and igniting the acetylene gas to form a reaction zone where a reaction is conducted for 40 min such that the temperature reaches 1600° C., then introducing acetylene gas into the reactor at a rate of 63.6 m$^3$/h and simultaneously introducing gaseous benzene into the reactor at a rate of 6.4 m$^3$/h, and collecting a product after the pyrolysis system runs for 80 min and the temperature of the reaction zone is stabilized at about 1500° C.

Example 3

The example of the present disclosure provides a production method for efficiently controlling a specific surface area of conductive carbon black, comprising: firstly introducing acetylene gas into a reactor at a rate of 70 m$^3$/h through a material delivering device and igniting the acetylene gas to form a reaction zone where a reaction is conducted for 40 min such that the temperature reaches 1600° C., then introducing acetylene gas into the reactor at a rate of 50 m$^3$/h and simultaneously introducing ethylene gas into the reactor at a rate of 20 m$^3$/h, and collecting a product after the pyrolysis system runs for 80 min and the temperature of the reaction zone is stabilized at about 1300° C.

Comparative Example 1

The comparative example of the present disclosure provides a production method for efficiently controlling a specific surface area of conductive carbon black, comprising: introducing acetylene gas into a reactor at a rate of 70 m$^3$/h through a material delivering device and igniting the acetylene gas to form a reaction zone, and collecting a product after the pyrolysis system runs for 120 min and the temperature reaches 1800° C.

Comparative Example 2

The comparative example of the present disclosure provides a production method for efficiently controlling a specific surface area of conductive carbon black, comprising: introducing acetylene gas into a reactor at a rate of 70 m³/h through a material delivering device and igniting the acetylene gas to form a reaction zone where a reaction is conducted for 40 min, then cooling the reactor by means of water cooling after the temperature reaches 1750° C., and collecting a product after the pyrolysis system runs for 80 min.

Comparative Example 3

The comparative example of the present disclosure provides a production method for efficiently controlling a specific surface area of conductive carbon black, comprising: firstly introducing acetylene gas into a reactor at a rate of 70 m³/h through a material delivering device and igniting the acetylene gas to form a reaction zone where a reaction is conducted for 40 min such that the temperature reaches 1600° C., then introducing acetylene gas into the reactor at a rate of 66.7 m³/h and simultaneously introducing gaseous toluene into the reactor at a rate of 3.3 m³/h, and collecting a product after the pyrolysis system runs for 80 min and the temperature of the reaction zone is stabilized at about 1700° C.

Comparative Example 4

The comparative example of the present disclosure provides a production method for efficiently controlling a specific surface area of conductive carbon black, comprising: firstly introducing acetylene gas into a reactor at a rate of 70 m³/h through a material delivering device and igniting the acetylene gas to form a reaction zone where a reaction is conducted for 40 min such that the temperature reaches 1600° C., and then introducing acetylene gas into the reactor at a rate of 46.7 m³/h and simultaneously introducing gaseous toluene into the reactor at a rate of 23.3 m³/h. The pyrolysis reaction stops after the pyrolysis system runs for 80 min.

Test Example 1

The products of conductive carbon black prepared in Examples 1 to 3 and Comparative Examples 1 to 4 are collected, respectively, and the distributions of the specific surface areas of the conductive carbon black are measured as shown in Table 1.

TABLE 1

Distributions of Specific Surface Areas of Products of Conductive Carbon Black of Examples 1 to 3 and Comparative Examples 1 to 4

| | Mass Ratio of Acetylene to Hydrocarbon | Other Cooling Means | Pyrolysis Temperature | Specific Surface Area (m²/g) |
|---|---|---|---|---|
| Example 1 | 1:0.2 | / | 1400 | 55 ± 2 |
| Example 2 | 1:0.1 | / | 1500 | 63 ± 2 |
| Example 3 | 1:0.4 | / | 1300 | 40 ± 2 |
| Comparative Example 1 | Pure Acetylene | / | 1800 | 84 ± 2 |
| Comparative Example 2 | Pure Acetylene | Water Cooling | 1750 | 81 ± 10 |
| Comparative Example 3 | 1:0.04 | / | 1700 | 79 ± 2 |
| Comparative Example 4 | 1:0.5 | / | Reaction Stopped | / |

It can be seen from the comparison between Example 1 and Comparative Example 1 that conductive carbon black has a higher specific surface area when the pyrolysis reaction occurs at a higher temperature, and conductive carbon black prepared by pyrolysis of pure acetylene has a specific surface area of 84±2 m²/g, which exceeds the desired range of the specific surface area of 40 to 80 m²/g.

It can be seen from the comparison between Example 1 and Comparative Example 2 that when the temperature of the reactor is reduced by means of water cooling, the reactor is cooled unevenly and there is a large temperature difference in the reaction zone, so that conductive carbon black is prepared with a specific surface area of 81±10 m²/g, and the specific surface areas of the prepared conductive carbon black are distributed unevenly. Moreover, the water cooling does not show a significant effect in the reduction of the temperature of the reaction zone.

It can be seen from the comparison between Example 1 and Comparative Examples 3 and 4 that conductive carbon black is prepared with a specific surface area of 79±2 m²/g, which does not completely satisfy the standard of 40 to 80 m²/g, when acetylene and the hydrocarbon raw material have a too large mass ratio, and that the pyrolysis reaction of acetylene will be stopped, when acetylene and the hydrocarbon raw material have a too small mass ratio.

In summary, in a production method for efficiently controlling a specific surface area of conductive carbon black according to the present disclosure, acetylene and a hydrocarbon raw material releasing less heat are pyrolyzed together, so that the pyrolysis reaction is controlled at a temperature of 1300 to 1500° C., whereby conductive carbon black is prepared with a specific surface area of substantially from 40 to 80 m²/g and with a uniformly distributed specific surface area, which can meet the corresponding production requirements. A material delivering device can mix two reaction raw materials uniformly. When the material delivering device is utilized in the production method for efficiently controlling a specific surface area of conductive carbon black described above, acetylene gas and the gaseous hydrocarbon raw material are advantageously mixed uniformly, so that the temperature is distributed uniformly in the reaction zone without partly having a higher or lower temperature. As a result, conductive carbon black is prepared with a specific surface area distributed uniformly.

The above description is merely illustrative of specific embodiments of the present disclosure and is not intended to limit the present disclosure. It will be understood by those skilled in the art that various changes and variations can be made to the present disclosure. Any modifications, equivalent alternatives, improvements and so on made within the spirit and principle of the present disclosure are to be included in the scope of protection of the present disclosure.

What is claimed is:

1. A production method for controlling a specific surface area of a conductive carbon black, comprising firstly introducing an acetylene, and igniting the acetylene to form a reaction zone at a temperature of 1500 to 1800° C., then introducing a hydrocarbon raw material into the reaction zone to occur a pyrolysis reaction, and collecting a product at a temperature of 1300 to 1500° C.,
   wherein the hydrocarbon raw material comprises an aromatic hydrocarbon or an olefin; and
   a mass ratio of the acetylene to the hydrocarbon raw material is 1:0.1 to 1:0.4.

2. The production method for controlling a specific surface area of a conductive carbon black according to claim 1, wherein the aromatic hydrocarbon comprises toluene and/or benzene; and the olefin comprises any one or more of ethylene, propylene and butadiene.

3. The production method for controlling a specific surface area of a conductive carbon black according to claim 1, wherein the mass ratio of the acetylene to the hydrocarbon raw material is 1:0.2 to 1:0.4.

4. The production method for controlling a specific surface area of a conductive carbon black according to claim 3, wherein the mass ratio of the acetylene to the hydrocarbon raw material is 1:0.2 to 1:0.3.

5. A production method for controlling a specific surface area of a conductive carbon black, comprising: firstly introducing an acetylene, and igniting the acetylene to form a reaction zone at a temperature of 1500 to 1800° C., delivering the acetylene and a hydrocarbon raw material in a preset mixed form to the reaction zone to occur a pyrolysis reaction and collecting a product at a temperature of 1300 to 1500° C., wherein the preset mixed form is a form in which the hydrocarbon raw material is surrounded by the acetylene;

the hydrocarbon raw material comprises an aromatic hydrocarbon or an olefin; and a mass ratio of the acetylene to the hydrocarbon raw material is 1:0.1 to 1:0.4.

6. A material delivering device, configured for implementing the production method for controlling a specific surface area of a conductive carbon black according to claim 5, wherein the material delivering device comprises a material delivering column extending from a first end to a second end, wherein the material delivering column comprises:

an inner layer, wherein a first cavity is formed by the inner layer, the first cavity has a first feed inlet provided at the first end and a first discharge outlet provided at the second end; and an outer layer, wherein a second cavity is formed between the inner layer and the outer layer, the second cavity has a second feed inlet provided at the first end and a second discharge outlet provided at the second end, wherein the first discharge outlet is provided with a first nozzle, the second discharge outlet is provided with a second nozzle, wherein the first nozzle is inclined outward from its center so that a material sprayed from the first nozzle is mixed uniformly with a material sprayed from the second nozzle.

7. The material delivering device according to claim 6, wherein the material delivering device comprises a charging device, wherein the charging device comprises:

a heater connected to the material delivering column, which is configured to heat to a gaseous state the hydrocarbon raw material in a liquid state at room temperature;

a storage tank connected to the heater, with the storage tank configured to store the hydrocarbon raw material; and a booster pump provided to the storage tank, with the booster pump configured to pump the hydrocarbon raw material.

8. The material delivering device according to claim 7, wherein the charging device comprises a flow meter provided between the heater and the material delivering column, wherein the flow meter is configured to indicate a volume of the hydrocarbon raw material delivered.

9. The material delivering device according to claim 7, wherein the charging device comprises an electric valve provided between the heater and the material delivering column, wherein the electric valve is configured to control opening and closing of the charging device.

* * * * *